US008416452B2

(12) United States Patent
Ogihara et al.

(10) Patent No.: US 8,416,452 B2
(45) Date of Patent: Apr. 9, 2013

(54) IMAGE FORMING APPARATUS THAT ADJUSTS COLOR MIXING

(75) Inventors: Atsushi Ogihara, Ebina (JP); Tetsuji Okamoto, Ebina (JP); Koichi Watanabe, Ebina (JP); Atsuyuki Kitamura, Ebina (JP); Masahiro Sato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1043 days.

(21) Appl. No.: 12/401,326

(22) Filed: Mar. 10, 2009

(65) Prior Publication Data

US 2009/0244571 A1 Oct. 1, 2009

(30) Foreign Application Priority Data

Mar. 26, 2008 (JP) ................................ 2008-081006

(51) Int. Cl.
*G06F 15/00* (2006.01)

(52) U.S. Cl.
USPC ........... 358/1.9; 358/1.14; 358/515; 358/518; 358/519; 358/523

(58) Field of Classification Search ................... 358/1.9, 358/501, 504, 518, 523
See application file for complete search history.

(56) References Cited

U.S. PATENT DOCUMENTS 5,881,211 A * 3/1999 Matsumura .................... 358/1.9
7,650,086 B2 1/2010 Takahashi et al.
2004/0008999 A1 1/2004 Lino
2005/0280846 A1* 12/2005 Ichitani .......................... 358/1.9
2007/0211277 A1* 9/2007 Kaneko et al. ................. 358/1.9

FOREIGN PATENT DOCUMENTS

CN 101101468 A 1/2008
JP 06-337567 12/1994
JP 08-275013 10/1996
JP 2003-345100 12/2003
JP 2004-020599 1/2004

OTHER PUBLICATIONS

Chinese Office Action dated Nov. 27, 2012 for corresponding Chinese Patent Application No. 200910128478.4.

* cited by examiner

*Primary Examiner* — Benny Q Tieu
*Assistant Examiner* — Juan M Guillermety
(74) *Attorney, Agent, or Firm* — Sughrue Mion, PLLC

(57) ABSTRACT

An image forming apparatus includes: an image output unit that outputs an image; and an image processing unit that converts an input image signal to an output image signal and outputs the image signal to the image output unit, the image output unit having: an image carrier that carries at least a latent image; plural developer containers containing mutually different color developers used for developing the latent image carried on the image carrier; and a transport member for repeated operations of attachment of the developer contained in one of the plural developer containers, transport of the attached developer to the image carrier, and removal of remaining developer, and the image processing unit having a change unit that changes a color conversion characteristic of an image signal in correspondence with color mixture of the mutually different color developers.

15 Claims, 6 Drawing Sheets

IMAGE FORMING APPARATUS THAT ADJUSTS COLOR MIXING

CROSS-REFERENCE TO RELATED APPLICATIONS

This application is based on and claims priority under 35 USC 119 from Japanese Patent Application No. 2008-081006 filed Mar. 26, 2008.

BACKGROUND

Technical Field

The present invention relates to an image forming apparatus.

SUMMARY

According to an aspect of the invention, the invention resides in an image forming apparatus including: an image output unit that outputs an image; and an image processing unit that converts an input image signal to an output image signal and outputs the image signal to the image output unit, the image output unit having: an image carrier that carries at least a latent image; plural developer containers containing mutually different color developers used for developing the latent image carried on the image carrier; and a transport member for repeated operations of attachment of the developer contained in one of the plural developer containers, transport of the attached developer to the image carrier, and removal of remaining developer, and the image processing unit having a change unit that changes a color conversion characteristic of an image signal in correspondence with color mixture of the mutually different color developers.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described based on the drawings.

Figure 1:
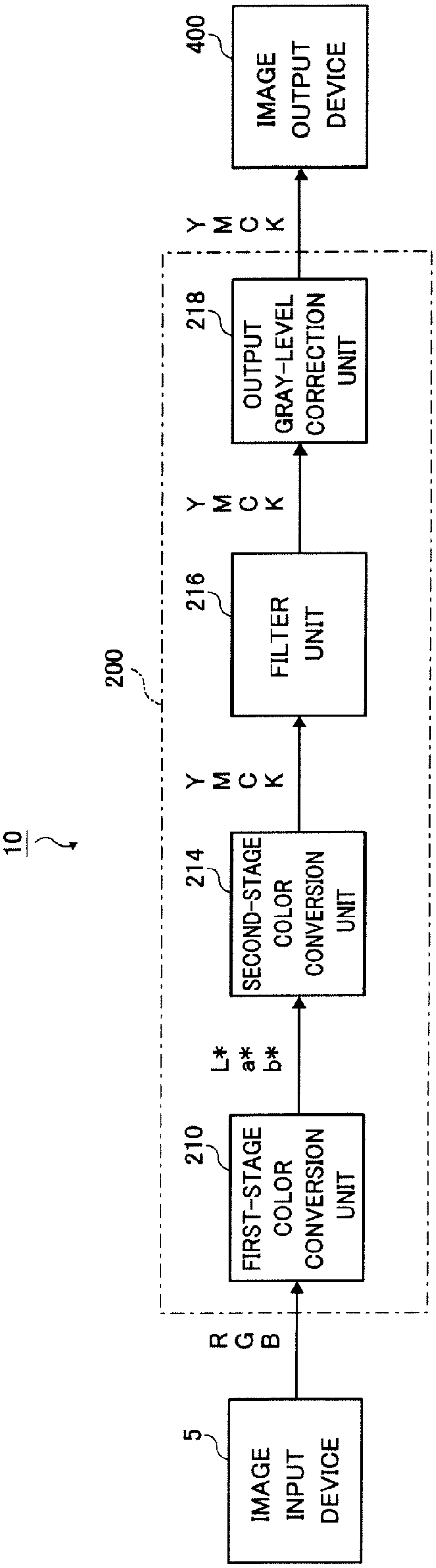
FIG. 1 is a block diagram showing an image forming apparatus according to an exemplary embodiment of the present invention.

FIG. 1 shows an image forming apparatus 10 according to an exemplary embodiment of the present invention. The image forming apparatus 10 has an image processing device 200 used as an image processor and an image output device 400 used as an image output unit.

The image processing device 200 is used for converting an input image signal, inputted from an image input device 5 which is an external device such as a personal computer, to an output image signal, and outputting the signal to the image output device 400. The image processing device 200 has a first-stage color conversion unit 210, a second-stage color conversion unit 214, a filter unit 216 and an output gray-level correction unit 218. Note that the image forming apparatus 10 according to the exemplary embodiment does not have the image input device 5, and an image signal is inputted from the image input device 5 as an external device of the image forming apparatus 10. However, it may be arranged such that the image forming apparatus 10 itself has the image input device 5 such as an image scanner, and an input image signal is inputted from this image input device 5 into the image processing device 200.

The first-stage color conversion unit 210 converts the input image signal, which is an RGB data signal inputted from the image input device 5, into a signal of data in one of device-independent uniform color space, i.e., an L*a*b* color-space data signal.

The second-stage color conversion unit 214 converts the L*a*b* color-space data signal from the first-stage color conversion unit 210 into a YMCK data signal corresponding to the characteristic of the image output device 400.

The filter unit 216, which is a digital filter, filters the signal from the second-stage color conversion unit 214.

The output gray-level correction unit 218 performs gray level processing such as screen processing on the signal outputted from the filter unit 216 and image correction in correspondence with temperature/humidity environment and/or time deterioration of the image output device 400, and outputs the gray-level processed signal to the image output device 400.

Figure 2:
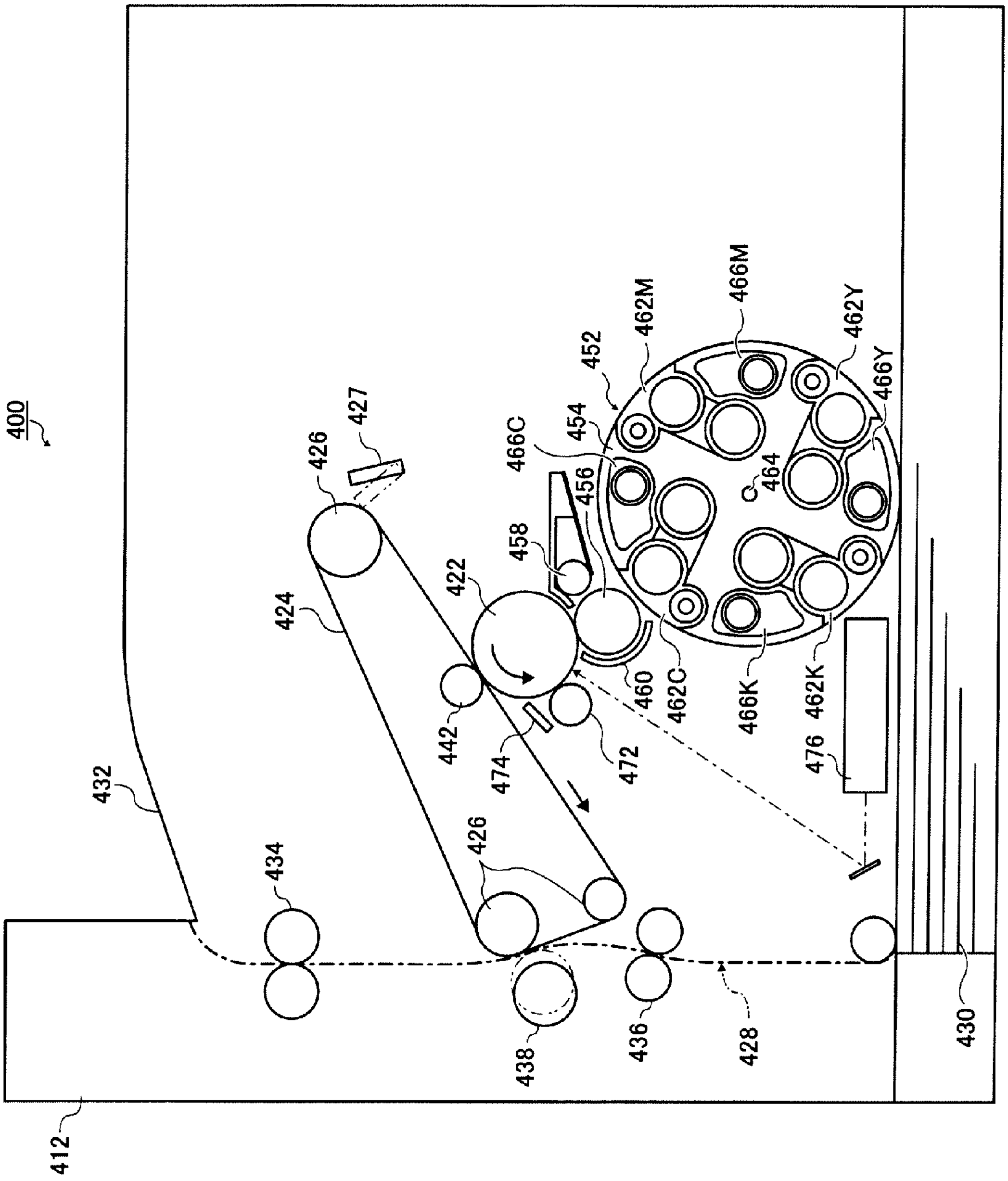
FIG. 2 is a cross-sectional view showing an image output device of the image forming apparatus according to the exemplary embodiment of the present invention.

FIG. 2 shows the image output device 400.

The image output device 400 has an image output device main body 412. A developing device 452 is provided in e.g. the approximately central portion of the image output device main body 412. The developing device 452 has a developing device main body 454, a developing roller 456, a layer thickness regulating member 458, a developing roller container wall 460, developer cartridges 462Y, 462M, 462M, 462C and 462K, and developer containers 466Y, 466M, 466C and 466K. The developing device 452 develops and visualizes an electrostatic latent image carried on a photoreceptor drum 422 to be described later using four color developers used as mutually different color developers.

The developing device main body 454 is supported in the image output device main body 412 rotatably about a rotation shaft 464. In the developing device main body 454, the developer cartridges 462Y, 462M, 462C and 462K and the developer containers 466Y, 466M, 466C and 466K are removably attached. When the developing device main body 454 is rotated about the rotation shaft 464, the developer cartridges 462Y, 462M, 462C and 462K are sequentially moved to a position opposite to the developing roller 456, and the developer can be supplied from the developer cartridge 462 moved to the position opposite to the developing roller 456 to the developing roller 456.

The developer cartridge 462Y and the developer container 466Y contain yellow developer. The developer cartridge 462M and the developer container 466M contain magenta developer. The developer cartridge 462C and the developer container 466C contain cyan developer. The developer cartridge 462K and the developer container 466K contain black developer.

The developer containers 466Y, 466M, 466C and 466K respectively have an unused developer container containing unused developer supplied to the developer cartridges 462Y, 462M, 462C and 462K, and a collected developer container containing developer supplied to the developing roller 456 and removed (collected) from the developing roller 456 after development. The developer collected in the collected developer container is repeatedly supplied to the developing roller 456 and used for development of a latent image formed on the photoreceptor drum 422.

The developer cartridge 462Y and the developer container 466Y, the developer cartridge 462M and the developer container 466M, the developer cartridge 462C and the developer container 466C, and the developer cartridge 462K and the developer container 466K, as integrated units, are used as plural developer containers containing mutually different color developers used for development of a latent image carried on the photoreceptor drum 422.

Note that the developer contained in the developer cartridges 462Y, 462M, 462C and 462K is e.g. two-component developer having non-magnetic toner and magnetic carrier in which the non-magnetic toner is attached to the periphery of the magnetic carrier.

The developing roller 456 is used as one transport member for repeated operations of attachment of the developer contained in one of the developer cartridges 462Y, 462M, 462C, 462K or the like, development of a latent image formed on the photoreceptor drum 422 with the attached developer, and removal of remaining developer. The developing roller 456 is accommodated in the developing roller container wall 460 with a portion opposite to the photoreceptor drum 422 opened to be exposed. The developing roller 456 supplies each of the color developers carried by a magnetic force to the photoreceptor drum 422 while forming a predetermined gap between the developing roller 456 and the photoreceptor drum 422.

The layer thickness regulating member 458 which is a rotatable roller-shaped member of e.g. aluminum (conductive member) is provided in a position away from the developing roller 456 with a predetermined gap. The layer thickness regulating member 458 regulates the layer thickness (height or amount) of a developer attached to the surface of the developing roller 456 (carried by the developing roller 456).

The photoreceptor drum 422 used as an image carrier to at least carry a latent image is provided in the vicinity of the developing device 452. A charging device 472 which is e.g. a charging roller to uniformly charge the photoreceptor drum 422 is provided on the front side of the photoreceptor drum 422. Further, a photoreceptor cleaner 474 abuts against the photoreceptor drum 422 on the upstream side of the charging device 472 in a rotational direction of the photoreceptor drum 422. The photoreceptor cleaner 474 scrapes developer remaining on the photoreceptor drum 422 after transfer.

An optical writing device 476 which writes a latent image with a light ray such as a laser beam on the photoreceptor drum 422 charged by the charging device 472 is provided on e.g. the side of the developing device 452. Further, a first transfer roller 442 is provided in contact with the photoreceptor drum 422 via a transfer belt 424 to be described later. The first transfer roller 442 is used for transfer of a developer image visualized by the developing device 452 to the transfer belt 424 in a transfer position.

Further, in the image output device main body 412, the transfer belt 424 is provided to be in contact with the photoreceptor drum 422. The transfer belt 424 is placed around plural (e.g. three) support rollers 426, and driven and turned with one of the plural support rollers 426 as a driving roller. A toner image on the photoreceptor drum 422 is transferred onto the transfer belt 424, and the toner image is transported by rotation of the transfer belt 424 to a transport path 428 formed in e.g. the image output device main body 412.

The transport path 428 is formed in an approximately vertical direction from e.g. a paper supply tray 430 provided in the vicinity of a bottom of the image output device main body 412 to e.g. a discharge paper tray 432 which is an upper part of the image output device main body 412. A registration roller 436, a second transfer roller 438, and a fixing device 434 are provided along the transport path 428 sequentially from the upstream side in a paper transport direction. The second transfer roller 438, in contact with one of the support rollers 426 via the transport path 428, is used for transfer of a toner image from the transfer belt 424 to a print sheet transported in the transport path 428.

The registration roller 436 is used for supply of a print sheet to a position in which the transfer belt 424 and the second transfer roller 438 are in contact with each other, at timing of image formation. Further, the fixing device 434 is used for fixing the toner image, transferred to the print sheet with the second transfer roller 438, to the print sheet with heat and pressure. The print sheet to which the toner image has been fixed by the fixing device 434 is transported in the transport path 428, and sent to the discharge paper tray 432.

In the image output device 400 having the above structure, the photoreceptor drum 422 is rotated in a counterclockwise direction in FIG. 2. The surface of the photoreceptor drum 422 is uniformly charged by the charging device 472, and the uniformly-charged surface of the photoreceptor drum 422 is scanned with a laser beam by the optical writing device 476 and a latent image is formed on the surface of the photoreceptor drum 422. At this time, the optical writing device 476 is controlled based on image data generated by an external device or image data read with a scanner if provided, and performs optical writing to form a latent image corresponding to the image data.

The latent image on the surface of the photoreceptor drum 422 written by the optical writing device 476 is developed by the developing device 452. That is, in a position where the photoreceptor drum 422 is in contact with or very close to the developing roller 456, toner is attracted from the developing roller 456 by the electric charge on the surface of the photoreceptor drum 422, and the latent image is developed with the toner as a toner image. The toner image formed on the photoreceptor drum 422 is transported to a position opposite to the transfer belt 424 in accordance with rotation of the photoreceptor drum 422, and transferred (first-transferred) to the transfer belt 424 with the first transfer roller 442.

The surface of the photoreceptor drum 422 when the toner image has been transferred is cleaned with the photoreceptor cleaner 474, and again arrives at the charging device 472, then again charged by the charging device 472. Thereafter, the above operation is repeated and a toner image corresponding to one print sheet is formed on the transfer belt 424.

Upon formation of a multi-color image, when one color toner image has been transferred onto the transfer belt 424, the developing device main body 454 is rotated about the rotation shaft 464, such that another color developer cartridge 462 comes opposite to the developing roller 456, and the toner in the other color is supplied to the photoreceptor drum 422 using the developing roller 456, thereby a toner image in the other color is formed on the surface of the photoreceptor drum 422. Then the toner image in the other color is transferred to the surface of the transfer belt 424 with the first transfer roller 442.

Then, a toner image, in which e.g. yellow, magenta, cyan and black color images are overlaid, on the surface of the transfer belt 424, is transferred with the second transfer roller 438 to a print sheet transported in the transport path 428. After the transfer, toner remaining on the transfer belt is removed by contact by a transfer belt cleaner 427, attached movably to/from the transfer belt 424, with the transfer belt 424 only during clean-up time.

Figure 3:
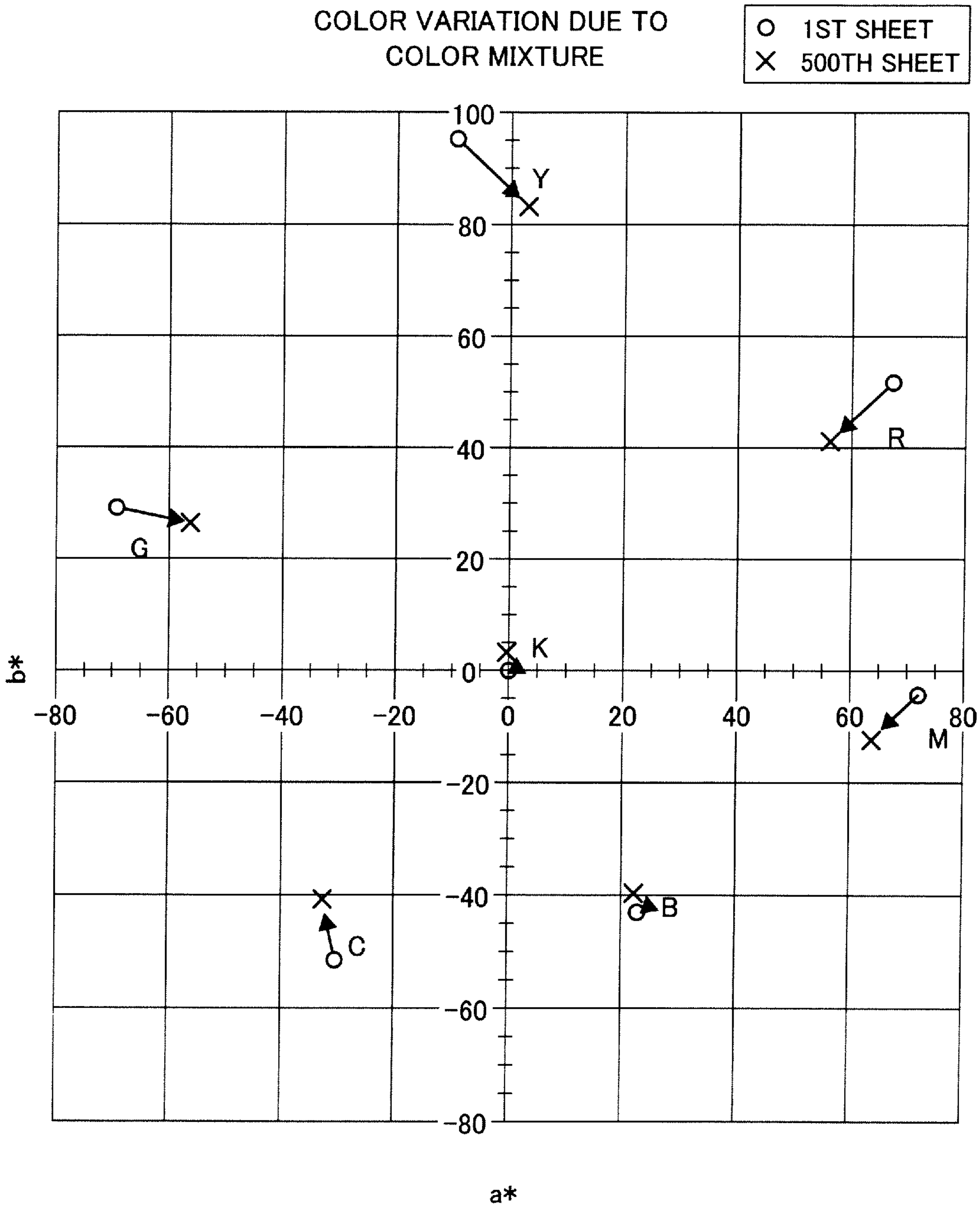
FIG. 3 is a first graph showing color variation corresponding to the number of outputs of an image outputted in the exemplary embodiment of the present invention.
Figure 4:
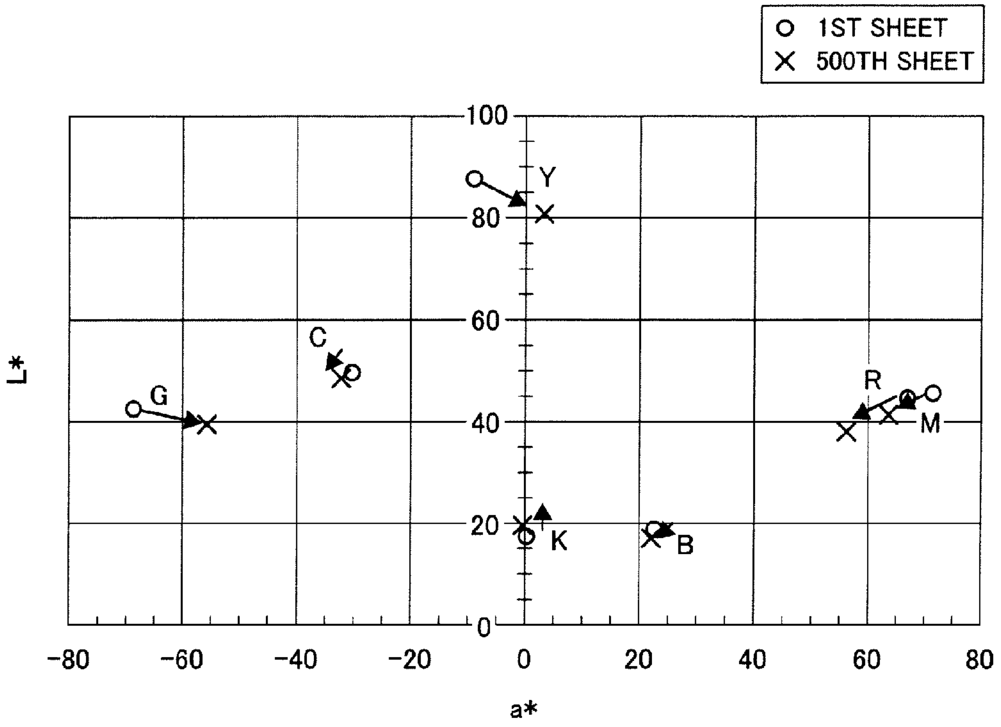
FIG. 4 is a second graph showing the color variation corresponding to the number of outputs of an image outputted in the exemplary embodiment of the present invention.
Figure 5:
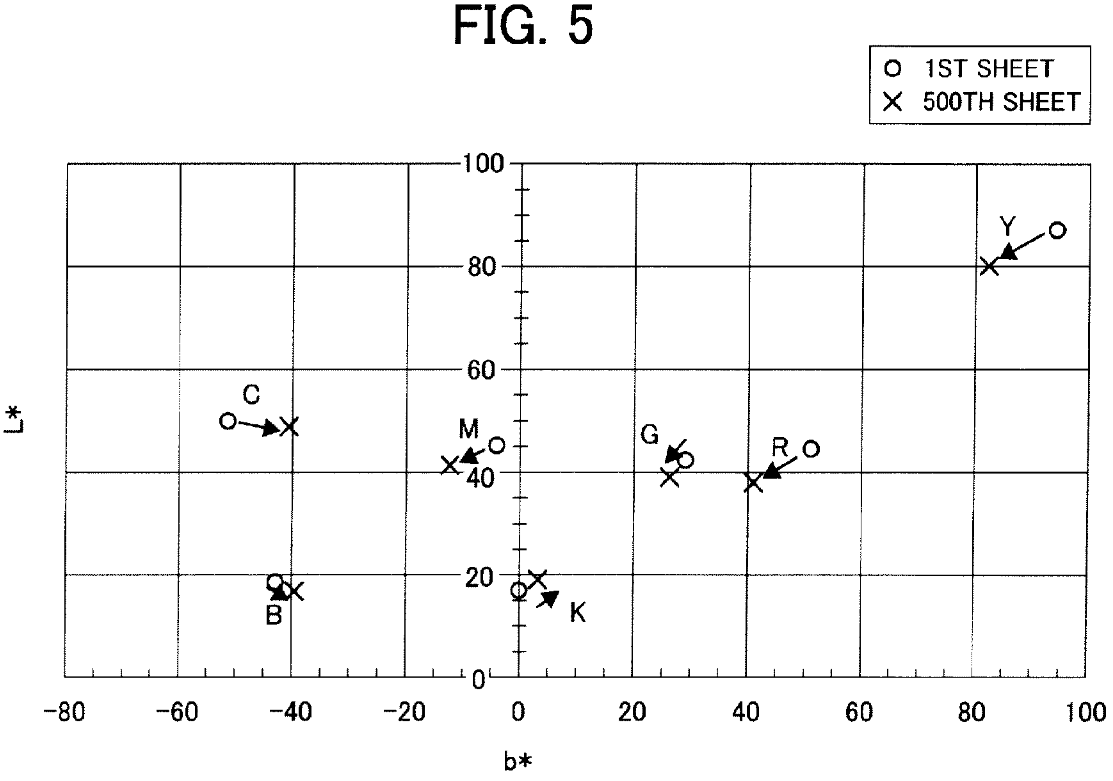
FIG. 5 is a third graph showing the color variation corresponding to the number of outputs of an image outputted in the exemplary embodiment of the present invention.

FIGS. 3 to 5 show color variation corresponding to the number of outputs of an image outputted in the exemplary embodiment of the present invention. Particularly, FIG. 3 shows a projection drawing to an a*b* plane in the L*a*b* color space, FIG. 4 shows a projection drawing to an a*L* plane, and FIG. 5 shows a projection drawing to a b*L* plane. Further, in FIGS. 3 to 5, the developer containers 466Y, 466M, 466C and 466K in a shipment state and an unused state are attached to the image output device 400, then the image output to the first A4-sized print sheet is indicated as "○", and the image output to the five-hundredth A4-sized print sheet is indicated as "×".

More particularly, in FIGS. 3 to 5, an A4-sized image, in which the coverages of yellow (Y), magenta (M), cyan (C) and black (K) image areas are 20%, is outputted using the developer containers 466Y, 466M, 466C and 466K each containing 230 grams of developers. FIGS. 3 to 5 show colorimetric data on a single color yellow image, a single color magenta image, a single color cyan image and a single color black image in the image on the first print sheet, and colorimetric data on the single color yellow image, the single color magenta image, the single color cyan image and the single color black image in the image on the five-hundredth print sheet, after output of the A4-sized image on four hundred ninety-nine print sheets on the same condition.

Further, regarding a blue (B) image formed with the magenta developer and the cyan developer, a green (G) image formed with the cyan developer and the yellow developer and a red (R) image formed with the yellow developer and the magenta developer, FIGS. 3 to 5 also show colorimetric data on the first print sheet and colorimetric data on the five hundredth print sheet on the same condition as that for the above-described yellow, magenta, cyan and black images.

As shown in FIGS. 3 to 5, the colorimetric data vary between the first output and the five hundredth output in all the Y, M, C, K, B, G and R images. When an image is outputted by the image output device 400, the developing roller 456 is used in common for use of the yellow developer, the magenta developer, the cyan developer and the black developer. Further, when developers remaining on the surface of the developing roller 456 are collected into the collected developer container of the developer containers 466Y, 466M, 466C and 466K, other color developer(s) is mixed in the collected developer container, and the developer mixed with the other color developer(s) is used in the next image output. These facts cause the color variation.

Figure 6:
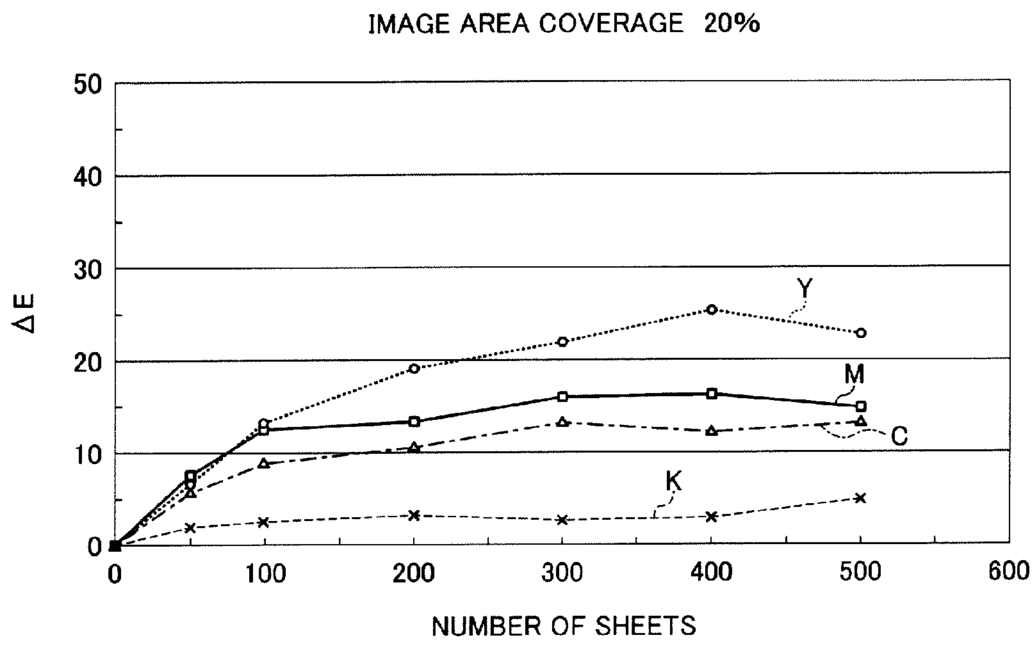
FIG. 6 is a first graph showing the relation between image area coverage and color variation in an image outputted in the exemplary embodiment of the present invention.
Figure 7:
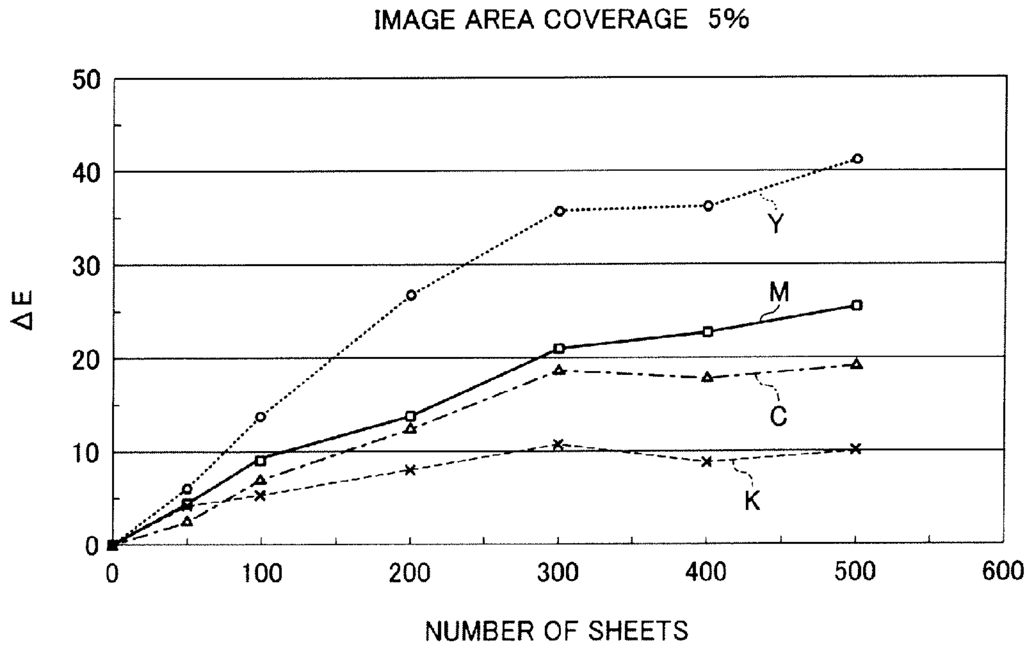
FIG. 7 is a second graph showing the relation between image area coverage and color variation in an image outputted in the exemplary embodiment of the present invention.

FIGS. 6 and 7 show color difference variation in a single color yellow image, a single color magenta image, a single color cyan image and a single color black image corresponding to the number of image outputs. FIG. 6 shows color difference variation in each of the images when the image area coverage of an output image is 20%, and FIG. 7 shows color difference variation in each of the images when the image area coverage of an output image is 5%.

More particularly, FIGS. 6 and 7 show the number of output images (the number of print sheets) on the horizontal axis, and on the vertical axis, the color differences between patch images of single color solid images (the image area coverages are 100%) outputted prior to the measurement as reference images and single color solid patch images outputted after completion of output by hundred sheets.

As it is understood from a comparison between FIGS. 6 and 7, in the case of FIG. 6 in which the image area coverage is high, the color difference variation is smaller than that in the case of FIG. 7 in which the image area coverage is low. In an image having high image area coverage and high density, a large amount of developer is consumed, and a large amount of developer, mixed with other color developer(s) from the developer cartridge 462 and the like, is discharged, and in accordance with the developer discharge, developer without color mixture is newly supplied from the unused developer container of the developer container 466. Thus the percentage of other color developer(s) mixed with the developer contained in the developer cartridge 462 and the like is reduced.

Figure 8:
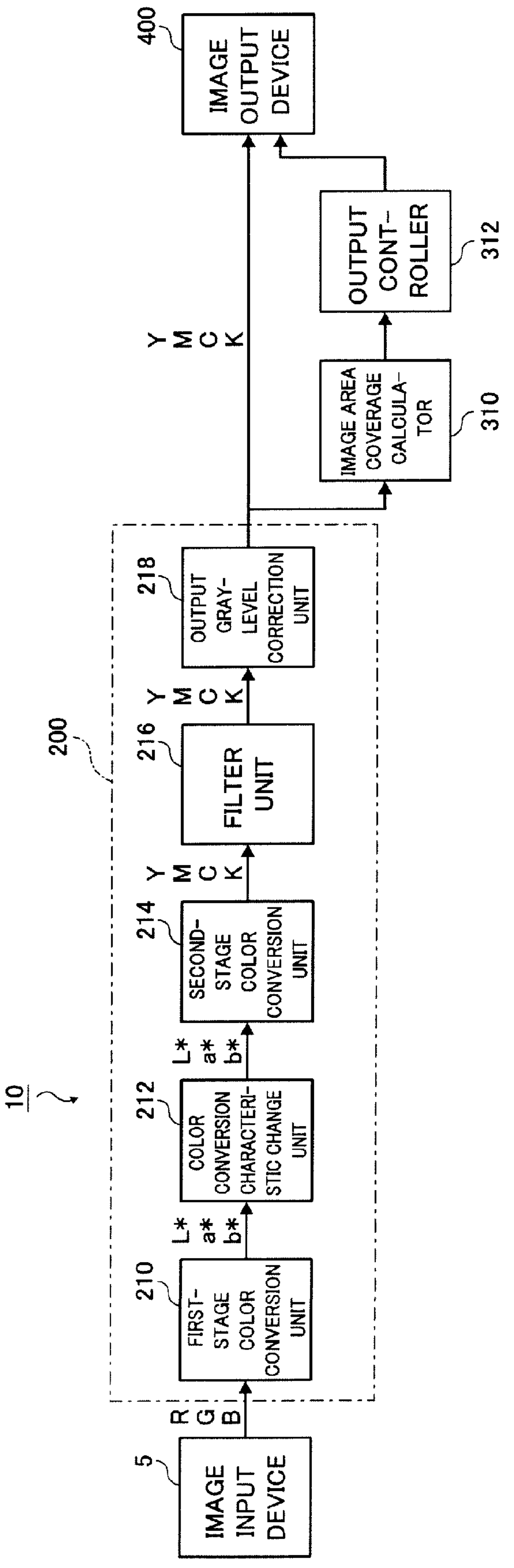
FIG. 8 is a block diagram showing the image forming apparatus according to another exemplary embodiment of the present invention.

FIG. 8 shows the image forming apparatus 10 according to another exemplary embodiment of the present invention.

The image forming apparatus 10 according to the present exemplary embodiment of the present invention has, in addition to the constituent elements of the image forming apparatus 10 according to the previously-described exemplary embodiment of the present invention, an image area coverage calculator 310 and an output controller 312, and further, the image processing device 200 is provided with a color conversion characteristic change unit 212. The constituent elements other than those particularly explained in the following description are the same as those in the image forming apparatus 10 according to the previously-described exemplary embodiment of the present invention.

The color conversion characteristic change unit 212 is used as a change unit that changes the color conversion characteristic of an image signal in correspondence with the number of times of image output to suppress color variation among plural images due to color mixture of mutually different color developers. The color conversion characteristic change unit 212 performs color conversion processing of an image signal corresponding to color mixture of developers on L*a*b* data inputted from the first-stage color conversion unit 210. That is, the color conversion characteristic change unit 212 predicts color mixture of developers which occurs in each image outputted in one print job, in correspondence with e.g. the number of images (the number of print sheets) outputted in the print job, and performs color conversion on the L*a*b* data inputted from the first-stage color conversion unit 210 in accordance with the prediction to suppress color variation among the images outputted through the one print job.

For example, the same output condition as that in the above-described output condition shown in FIGS. 3 to 5, i.e., continuous output of an image in which the image area coverage is 20% on five hundred A4 print sheets is used. When image data (L*:87.59, a*:−8.79, b*:95.03) corresponding to a yellow solid image (the image area coverage is 100%) is inputted, in color correction for the first output, an image signal is color-converted to obtain colorimetric values of the five-hundredth output image (see "×" in FIGS. 3 to 5), L*:80.61, a*:−3.35, b*:83.12. Further, for the second output, the image signal is corrected with a weighted average by (the number of all print sheets-the number of up-to-the-present print sheets)÷the number of all print sheets for the amount of color variation between the first output and the five-hundredth output. Further, for the five-hundredth output, the values of the input L*a*b* data, L*:87.59, a*:−8.79, b*:95.03 are outputted without any change.

As described above, the color conversion characteristic of an image signal is changed in correspondence with the number of times of image output. The image in the first output in which mixture of developers has not been progressed is developed using developer in which color mixture has not been progressed, based on image data corresponding to the five-hundredth output in which color mixture has been progressed. Thus a yellow solid image corresponding to the L*a*b* values in the five-hundredth image is outputted. Further, in the five-hundredth output, although the image data is not corrected, an image is outputted with the developer in which the color mixture has been progressed, thereby a yellow solid image corresponding to the L*a*b* values in the five-hundredth image similar to the first image is outputted.

The image signal of image data upon change of color conversion characteristic for the n-th output is represented as follows.

$$L^*n = L^*1 - (L^*1 - L^*500) \times (T - n) \div 500$$

$$a^*n = a^*1 - (a^*1 - a^*500) \times (T - n) \div 500$$

$$b^*n = b^*1 - (b^*1 - b^*500) \times (T - n) \div 500$$

n: the number of up-to-the-present print sheets

T: the number of all print sheets

Actually, plural YMCK patch images at equal intervals in the L*a*b* space are outputted using developers prior to color mixture and subsequent to the color mixture, and the L*a*b* values of the plural patch images using the developers are measured. That is, the variation between the L*a*b* values prior to the color mixture and the L*a*b* values subsequent to the color mixture is previously obtained by the same image data, and color correction processing is performed using the above-described expressions with the variation as conversion coefficients (corresponding to "L*1–L*500", "a*1–a*500", "b*1–b*500" in the expressions).

As described above, the color conversion characteristic change unit 212 predicts the amount of mixture of other color developer(s) with current color developer used in image output, changes the color conversion characteristic to increase/decrease the color components in an image signal. Further, the color conversion characteristic change unit 212 changes the color conversion characteristic of the image signal to cause color mixture in an initial state, and to reduce the color mixture by the image signal with the progress of mixture of the mutually different color developers. Further, in the image forming apparatus 10 according to the present exemplary embodiment of the present invention, the color conversion characteristic of an image signal is changed in correspondence with the number of output images; however, it may be arranged such that the color conversion characteristic change unit 212 changes the color conversion characteristic of the image signal in correspondence with at least one of the number of times of attachment to and removal of a developer from the developing roller 456, the number of output images, and an integrated value of image data.

As in the case of the image forming apparatus 10 according to the previously-described exemplary embodiment of the present invention, the signal in which the color conversion characteristic has been changed by the color conversion characteristic change unit 212 is converted to YMCK data corresponding to the characteristic of the image output device 400 by the second-stage color conversion unit 214, then filtered by the filter unit 216, then subjected to screen processing and image correction corresponding to temperature/humidity environment and/or time deterioration of the image output device 400 by the output gray-level correction unit 218, and sent as YMCK data to the image output device 400.

Note that in the image forming apparatus 10 according to the previously-described exemplary embodiment of the present invention, a signal is outputted from the output gray-level correction unit 218 only to the image output device 400. On the other hand, in the image forming apparatus 10 according to the present exemplary embodiment of the present invention, an image signal is outputted from the output gray-level correction unit 218 to the image area coverage calculator 310 in addition to the image output device 400.

The image area coverage calculator 310 is used as a calculation unit that calculates an image area coverage as the percentage of an area to which developer is attached in the total area of a print sheet. The image area coverage calculator 310 calculates the area coverage of an A4-sized output image, based on input image data, by e.g. five image outputs (five print sheets). Then, the image area coverage calculator 310 outputs the obtained image area coverage to the output controller 312.

The output controller 312 is used as an output controller that, when the image area coverage calculated by the image area coverage calculator 310 is lower than a predetermined image area coverage, controls the image output device 400 to output an image in which the image area coverage is higher than the predetermined image area coverage, in correspondence with the difference between the predetermined image area coverage and the image area coverage calculated by the image area coverage calculator 310. For example, when the predetermined image area coverage is 20% and the image area coverage calculated by the image area coverage calculator 310 is lower than 20%, the output controller 312 instructs the image output device 400 to output a toner band image corresponding to a value obtained by multiplying the difference between the predetermined and target image area coverage, 20%, and the area coverage calculated by image area coverage calculator 310, by the number of print sheets (five print sheets in this example).

When an image output instruction has been made from the output controller 312, in the image output device 400, a developer image is transferred to the transfer belt, thereafter, the developer image is not transferred to a print sheet, but is removed by the transfer belt cleaner 427.

As described above, when the image area coverage in a predetermined number of output images is lower than a predetermined value, the output controller 312 controls the image output device 400 to output an image in which the image area coverage is higher than the predetermined image area coverage. Accordingly, developer contained in the developer cartridge 462 and the like mixed with other color developer(s) is discharged from the developer cartridge 462 and the like, and developer not mixed with other color developer(s) is supplied from the unused developer container of the developer container 466 into the developer cartridge 462 and the like. Accordingly, the percentage of other color developer(s) mixed with the developer in the developer cartridge 462 is reduced, thereby color variation due to mixture of other color developer(s) with the developer is suppressed.

In the image forming apparatus 10 according to the above-described exemplary embodiment of the present invention, the color conversion characteristic change unit 212 changes the color conversion characteristic of an image signal to suppress color variation among plural images outputted through one job. It may be arranged such that the range of image output for suppression of color variation (the value of T in the above-described expressions) is changed to an arbitrary number of output sheets inputted by a user, a possible total number of outputs before developer change, or the like, by job. Further, in the above description, the image area coverage of output is 20%; however, it may be arranged such that on the presumption that a coefficient which differs by image area coverage of each output is used, the user selects the area coverage of an image to be outputted and inputs the selected area coverage. Further, it may be arranged such that a reference image area coverage for a current output image is determined based on the image area coverages of past images outputted before the output of the current image.

Note that in the above exemplary embodiment, the amount of mixture of a developer used in image output with another color developer is predicted, and the color conversion characteristic is changed to increase or decrease color components in an image signal. However, it may be arranged such that the degrees of actual color mixture of developers in the respective developer containers are detected by a detection unit, and the color conversion characteristic is changed to increase or decrease the color components in the image signal.

In this case, a predetermined image pattern is developed on the photoreceptor drum 422 and transferred onto the transfer belt 424, and the density and the color of the image pattern are detected by a detection sensor. Otherwise, the density and the color of a developer in the developer container is actually detected.

As described above, the present invention is applicable to an image forming apparatus such as a duplicator, a facsimile machine and a copier.

The foregoing description of the examples of the present invention has been provided for the purposes of illustration and description. It is not intended to be exhaustive or to limit the invention to the precise forms disclosed. Obviously, many modifications and variations will be apparent to practitioners skilled in the art. The examples were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image output unit that outputs an image; and an image processing unit that converts an input image signal to an output image signal and outputs the image signal to the image output unit, the image output unit comprising:

an image carrier that carries at least a latent image;

a plurality of developer containers containing mutually different color developers used for developing the latent image carried on the image carrier; and a transport member for repeated operations of attachment of the developer contained in one of the plurality of developer containers, transport of the attached developer to the image carrier, and removal of remaining developer, and the image processing unit comprising a change unit that changes a color conversion characteristic of an image signal in correspondence with color mixture of the mutually different color developers and a number of times of image output, the image forming apparatus further comprising:

an integration unit that integrates at least one of the number of times of image output, output image data, an amount of the developer supplied from a developer cartridge to a developer container, a number of times of attachment to and removal of developer from the transport member, and a developer supply period, to produce an integrated value; and an output controller that, when the integrated value is smaller than a reference value, controls the image output unit to output an image corresponding to a difference between the reference value and the integrated value.

2. The image forming apparatus according to claim 1, wherein the change unit predicts an amount of mixture of one color developer used in image output with another color developer, and changes the color conversion characteristic to increase or decrease each of color components in the image signal in correspondence with the predicted amount.

3. The image forming apparatus according to claim 1, further comprising a detection unit that detects a degree of color mixture of developers in the developer container, wherein each of the color components in an image signal are increased or decreased in correspondence with a result of detection by the detection unit.

4. The image forming apparatus according to claim 1, wherein the change unit changes the color conversion characteristic to cause color mixture by the image signal in an initial state, and to reduce the color mixture by the image signal with progress of mixture of the mutually different color developers.

5. The image forming apparatus according to claim 1, wherein the change unit changes the color conversion characteristic in correspondence with at least one of a number of times of attachment to and removal of the developer from the transport member, and an integrated value of image data.

6. The image forming apparatus according to claim 1, wherein the change unit changes the color conversion characteristic to suppress color variation among a plurality of images outputted through one job.

7. The image forming apparatus according to claim 1, further comprising:

a calculation unit that calculates an image area coverage as a coverage of an area to which the developer is attached in a total area of a print sheet; and the output controller, when the image area coverage calculated by the calculation unit is smaller than a reference image area coverage, controls the image output unit to output an image corresponding to a difference between the reference image area coverage and the image area coverage calculated by the calculation unit.

8. The image forming apparatus according to claim 1, further comprising an image signal input unit that inputs an image signal to the image processing unit.

9. An image forming apparatus comprising:

an image output unit that outputs an image; and an image processing unit that converts, according to a color conversion characteristic, an input image signal to an output image signal and outputs the image signal to the image output unit, the image processing unit comprising a change unit that changes the color conversion characteristic in correspondence with a color mixture of mutually different color developers and a number of times of image output, the image forming apparatus further comprising:

an integration unit that integrates at least one of the number of times of image output, output image data, an amount of developer supplied from a developer cartridge to a developer container, a number of times of attachment to and removal of developer from a transport member, and a developer supply period, to produce an integrated value; and an output controller that, when the integrated value is smaller than a reference value, controls the image output unit to output an image corresponding to a difference between the reference value and the integrated value.

10. An image forming apparatus comprising:

an image output unit that outputs an image, the image output unit comprising:

a plurality of developer containers, each containing a different color developer; and a common transport member that attaches and transfers the color developer one-by-one from the developer containers, and detaches residual color developer back into the respective developer containers; and an image processing unit that comprises a change unit that changes a color conversion characteristic in correspondence with a color mixture of different color developers in one of the plurality of developer containers, and converts, according to the color conversion characteristic, an input image signal to an output image signal and outputs the image signal to the image output unit, the image forming apparatus further comprising:

an integration unit that integrates at least one of a number of times of image output, output image data, an amount of developer supplied from a developer cartridge to a developer container, a number of times of attachment to and removal of developer from the common transport member, and a developer supply period, to produce an integrated value; and an output controller that, when the integrated value is smaller than a reference value, controls the image output unit to output an image corresponding to a difference between the reference value and the integrated value.

11. The image forming apparatus according to claim 10, wherein the change unit changes the color conversion characteristic in correspondence with the color mixture and a number of times of image output.

12. The image forming apparatus according to claim 10, wherein the change unit predicts an amount of color mixture in the one of the plurality of developer containers, and changes the color conversion characteristic based on the predicted amount.

13. The image forming apparatus according to claim 10, wherein the change unit changes the color conversion characteristic to cause color mixture by the image signal in an initial state, and to reduce the color mixture by the image signal with progress of mixture of the different color developers.

14. The image forming apparatus according to claim 10, wherein the change unit changes the color conversion characteristic in correspondence with at least one of a number of times of attachment to and removal of the developer from the transport member, and an integrated value of image data.

15. The image forming apparatus according to claim 10, wherein the change unit changes the color conversion characteristic to suppress color variation among a plurality of images outputted throughout one job.

* * * * *